US012811890B2

(12) United States Patent
Tano et al.

(10) Patent No.: US 12,811,890 B2
(45) Date of Patent: Nov. 24, 2026

(54) TIME SENSITIVE COMMUNICATION ASSISTANCE INFORMATION

(71) Applicant: Telefonaktiebolaget LM Ericsson (publ), Stockholm (SE)

(72) Inventors: Richard Tano, Stockholm (SE); Du Ho Kang, Sollentuna (SE); Fabian De Laval, Täby (SE); Andra Mihaela Voicu, Aachen (DE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 18/852,287

(22) PCT Filed: Mar. 29, 2023

(86) PCT No.: PCT/EP2023/058205
§ 371 (c)(1),
(2) Date: Sep. 27, 2024

(87) PCT Pub. No.: WO2023/187014
PCT Pub. Date: Oct. 5, 2023

(65) Prior Publication Data
US 2025/0202828 A1 Jun. 19, 2025

Related U.S. Application Data

(60) Provisional application No. 63/325,130, filed on Mar. 29, 2022.

(51) Int. Cl.
*H04L 47/28* (2022.01)

(52) U.S. Cl.
CPC .................................... *H04L 47/28* (2013.01)

(58) Field of Classification Search
CPC ...... H04L 47/31; H04L 47/127; H04L 69/321
See application file for complete search history.

(56) References Cited

U.S. PATENT DOCUMENTS

2021/0218686 A1* 7/2021 Galeev .................. H04L 43/022
2021/0273890 A1* 9/2021 Ayaz ..................... H04L 47/283
(Continued)

FOREIGN PATENT DOCUMENTS

WO 2021059538 A1 4/2021

OTHER PUBLICATIONS

International Search Report and Written Opinion dated Jun. 14, 2023 in International Application No. PCT/EP2023/058205 (10 pages).

(Continued)

*Primary Examiner* — Hee Soo Kim
(74) *Attorney, Agent, or Firm* — Rothwell, Figg, Ernst & Manbeck, P.C.

(57) ABSTRACT

The invention refers to a method performed by a network device the network device comprising an application function, the application function handling information units, wherein each information unit is associated to a set of packet data units, PDU sets, comprising identifying (S200) a plurality of PDU sets associated to a first PDU set flow: determining (S201) time sensitive information associated to the first PDU set flow; and generating (S202) time sensitive assistance information, TSCAI, comprising the time sensitive information; the invention further refers to a corresponding network device.

16 Claims, 9 Drawing Sheets

(56) References Cited

U.S. PATENT DOCUMENTS

| | | | | |
|---|---|---|---|---|
| 2022/0140930 | A1* | 5/2022 | Mehmedagic ........ | H04J 3/0661<br>370/503 |
| 2022/0338142 | A1* | 10/2022 | Minokuchi ......... | H04W 56/001 |
| 2023/0053602 | A1* | 2/2023 | Bonneville ........... | H04W 28/24 |

OTHER PUBLICATIONS

3GPP TS 23.501 V17.3.0 (Dec. 2021), Technical Specification, 3rd Generation Partnership Project, Technical Specification Group Services and System Aspects; System architecture for the 5G System (5GS); Stage 2 (Release 17) (559 pages).

3GPP TR 38.838 V0.1.0 (Oct. 2021), Technical Report, 3rd Generation Partnership Project; Technical Specification Group Radio Access Network; Study on XR (Extended Reality) Evaluations for NR (Release 17) (32 pages).

3GPP TR 23.700-36 V0.1.0 (Feb. 2022), Technical Report, 3rd Generation Partnership Project; Technical Specification Group Services and System Aspects; Study on Application Data Analytics Enablement Service; (Release 18) (13 pages).

3GPP TS 38.413 V16.8.0 (Dec. 2021), Technical Specification, 3rd Generation Partnership Project; Technical Specification Group Radio Access Network; NG-RAN; NG Application Protocol (NGAP) (Release 16) (475 pages).

3GPP TS 23.501 V17.2.0 (Sep. 2021), Technical Specification, 3rd Generation Partnership Project; Technical Specification Group Services and System Aspects; System architecture for the 5G System (5GS); Stage 2 (Release 17) (542 pages).

* cited by examiner

| Assistance Information | Description |
|---|---|
| Flow Direction | The direction of the TSC flow (uplink or downlink). |
| Periodicity | It refers to the time period between start of two data bursts. |
| Burst Arrival Time (optional) | The latest possible time when the first packet of the data burst arrives at either the ingress of the RAN (downlink flow direction) or the egress interface of the UE (uplink flow direction). |
| Survival Time (optional) | Survival Time, as defined in TS 22.261, is synonymous with the time period an application can survive without any data burst. |

Figure 1

| IE/Group Name | Presence | Range | IE type and reference | Semantics description |
|---|---|---|---|---|
| Periodicity | M | | INTEGER (0..640000, ...) | Periodicity expressed in units of 1 us. |

Figure 2

| IE/Group Name | Presence | Range | IE type and reference | Semantics description |
|---|---|---|---|---|
| Burst Arrival Time | M | | OCTET STRING | Encoded in the same format as the *ReferenceTime* IE as defined in TS 38.331. The value is truncated to 1 us granularity. |

Figure 3

| Assistance Information | Description |
|---|---|
| Flow Direction | The direction of the TSC flow (uplink or downlink). |
| Periodicity | It refers to the time period between start of two data bursts. |
| Burst Arrival Time (optional) | The time when the first packet of the data burst arrives at the ingress port of 5GS for a given flow direction (DS-TT for uplink, NW-TT for downlink). |
| Survival Time (optional) | It refers to the time period an application can survive without any data burst, as defined in clause C.2.3 of TS 22.104. |
| Time Domain (optional) | The (g)PTP domain of the TSC flow. |

Figure 4

TIME SENSITIVE COMMUNICATION ASSISTANCE INFORMATION

CROSS REFERENCE TO RELATED APPLICATIONS

This application is a 35 U.S.C. § 371 National Stage of International Patent Application No. PCT/EP2023/058205, filed 2023 Mar. 29, which claims priority to U.S. provisional patent application No. 63/325,130, filed on 2022 Mar. 29. The above-identified applications are incorporated by this reference.

TECHNICAL FIELD

The present application relates generally to the field of wireless communication networks, and more specifically to the provision Time Sensitive Communication Assistance Information within the context of time sensitive communication services such as extended reality services.

BACKGROUND 5G is the fifth generation of mobile communications, addressing a wide range of use cases from enhanced mobile broadband (eMBB) to ultra-reliable low-latency communications (URLLC) to massive machine type communications (mMTC). 5G includes the New Radio (NR) access stratum interface and the 5G Core Network (5GC). The NR physical and higher layers are reusing parts of the LTE specification, and to that add needed components when motivated by new use cases.

Low-latency high-rate applications such as extended Reality (XR) and cloud gaming are important in 5G era. XR may refer to all real-and-virtual combined environments and human- machine interactions generated by computer technology and wearables. It is an umbrella term for different types of realities including Virtual reality (VR), Augmented reality (AR), Mixed reality (MR), and the areas interpolated among them. The levels of virtuality range from partially sensory inputs to fully immersive VR.

5G NR is designed to support applications demanding high rate and low latency in line with the requirements posed by the support of XR and cloud gaming applications in NR networks. 3GPP Release 17 contains a study item on XR Evaluations for NR. The main objectives are to identify the traffic model for each application of interest, the evaluation methodology and the key performance indicators of interest for relevant deployment scenarios, and to carry out performance evaluations accordingly in order to investigate possible standardization enhancements in potential follow-up SI/WI.

The characteristics of XR traffic arrival may be quite distinct from typical web-browsing and Voice-over-IP, VoIP traffic. It is well expected that the arrival time is quasi-periodic and largely predictable similar to VoIP. However, its data size much larger than for VoIP. Similar to web-browsing, the data size is expected to be different at every application PDU arrival instance due e.g., to dynamics of contents and/or human interactivity with respect to the application.

XR applications typically generate traffic flows which are in principle periodic, e.g., video traffic with 30, 60, 90, or 120 fps. However, the traffic arrival moment at the RAN is affected by jitter around the periodicity value, due to processing of the frames at the application (e.g., for compression) and the capabilities of the platform used by the application, as well as transmission through the Core Network. This is modelled in 3GPP [4], by assuming that each data frame arriving at the RAN has a random jitter of [−4; +4] ms (optionally [−5; +5] ms) around the main periodicity. The probability of the jitter value within this interval is given by a truncated Gaussian distribution with mean 0 ms and standard deviation 2 ms.

XR traffic has strict delay requirements, in terms of packet delay budget (PDB). This is the maximum tolerable delay for a packet to be transmitted from a gNB to a UE. The PDB value depends on the XR traffic type and is overall between 5 ms and 30 ms.

In summary, in the context of XR and media services, IP traffic may be regarded as being inherently periodic, large and latency critical.

Time Sensitive Communication (TSC) Assistance Information (TSCAI) as defined e.g., in 3GPP standard document TS23.501 (current version 17.4.0) describes TSC traffic characteristics for use in the 5G System. TSCAI may be used by the 5G-access network 5G AN). The knowledge of TSC traffic pattern is useful for 5G-AN to allows more efficiently scheduling of QoS Flows that have a periodic, deterministic traffic characteristics either via Configured Grants, Semi-Persistent Scheduling or with Dynamic Grants. TSCAI describes TSC flow traffic characteristics at the gNB ingress and UE egress interface for traffic in downlink and uplink directions. TSCAI may be used by the 5G Access Network (5G-AN), if provided by the Session Management Function (SMF).

The application function (AF) may provide the traffic pattern parameters or values such as Burst Arrival Time with reference to the ingress port, Periodicity, Flow Direction, Survival Time and Time domain via a Network Exposure Function (NEF) to a Time Sensitive Communication and Time Synchronization Function (TSCTSF). Such traffic pattern information is e.g., shown in the Table of FIG. 1. FIGS. 2 and 3 by way of example show the information element (IE) names, types, references and semantic descriptions of the periodicity and the burst arrival time value.

The TSCTSF is responsible for determining and forwarding these traffic pattern parameters in within a so-called TSC Assistance Container to the SMF (via PCF). Such TSC Assistance Container is by way of example depicted in FIG. 4.

FIG. 5 illustrates the concept of determining above described traffic characteristics with respect to sets or bursts of PDUs B01, B02, B03, where each PDU burst consists of a plurality of PDUs arriving periodically (characterized by a time difference value td0) with a certain jitter J0. By way of example, the number PDUs within each PDU Set varies between consecutive PDU Set's. The interarrival time of PDUs inside a PDU Set may also vary.

The first PDU Set B01 by way of example comprises 5 PDUs where the first PDU inside the PDU Set arrives with negative jitter meaning it arrives slightly before the nominal arrival time i.e., the center of jitter range J0. The second PDU Set B02 by way of example comprises 4 PDUs where the first PDU arrives with positive jitter, meaning it arrives slightly later than the nominal arrival time. The third PDU Set B03 by way of example comprises 3 PDUs and arrives early.

As described, periodicity in the existing framework refers to time between the start of consecutive bursts of data. However, there may also be multiple PDU Set periodicities inside a QoS flow and thus one periodicity field may not be sufficient. IP packets being highly dependent on each other may be currently subject of independent treatment in RAN under existing QoS framework. PDUs associated to independent IP packets may fall within the same data burst and vice versa PDUs associated to dependent IP packets may fall into different PDU bursts being differently treated.

To improve/optimize network performance with XR traffic, e.g., with features enhancing scheduling and power saving, in may be beneficial to improve the concept of PDU sets.

SUMMARY

Exemplary embodiments disclosed herein address at least some of these problems, issues, and/or drawbacks of existing solutions.

The term 'PDU set' may be regarded as being composed of one or more PDUs carrying the payload of one unit of information generated at the application level (e.g. a frame or video slice for XRM Services), which are of same importance requirement at application layer. All PDUs in a PDU Set are commonly treated by the application layer to use the corresponding unit of information. In some cases, the application layer may still recover parts of the information unit, when some PDUs are missing.

Embodiments refer to a method performed by a network device, the network device comprising an application function, the application function handling information units, wherein each information unit is associated to a set of packet data units, PDU sets, wherein the followings steps are performed:

- identifying a plurality of PDU sets associated to a first PDU set flow;
- determining one or a plurality of data traffic values associated to the first PDU set flow; and
- generating time sensitive assistance information, TSCAI, comprising the one or a plurality of data traffic values.

The application function may handle information units associated to a least two PDU set flows, wherein the first PDU set flow is associated to a first application level service, and a second PDU set flow is associated to a second application level service, and wherein the network device determines for at least one of the first PDU set flow and the second PDU set flow one or more of the following time sensitive information:

- information indicative a periodicity of the PDU sets;
- information indicative of a jitter of generation of the PDU set;
- information indicative of a time adjustment made with respect o a reference clock; and
- information indicative of a PDU set arrival time.

Embodiments refer to a UE and a network application node performing the steps described above.

These and other objects, features and advantages of the present disclosure will become apparent upon reading the following Detailed Description in view of the Drawings briefly described below.

BRIEF DESCRIPTION OF THE DRAWINGS

FIGS. 1-4 shows exemplary tables with respect to time sensitive communication assistance information according to the prior art.

DETAILED DESCRIPTION

Figure 5:
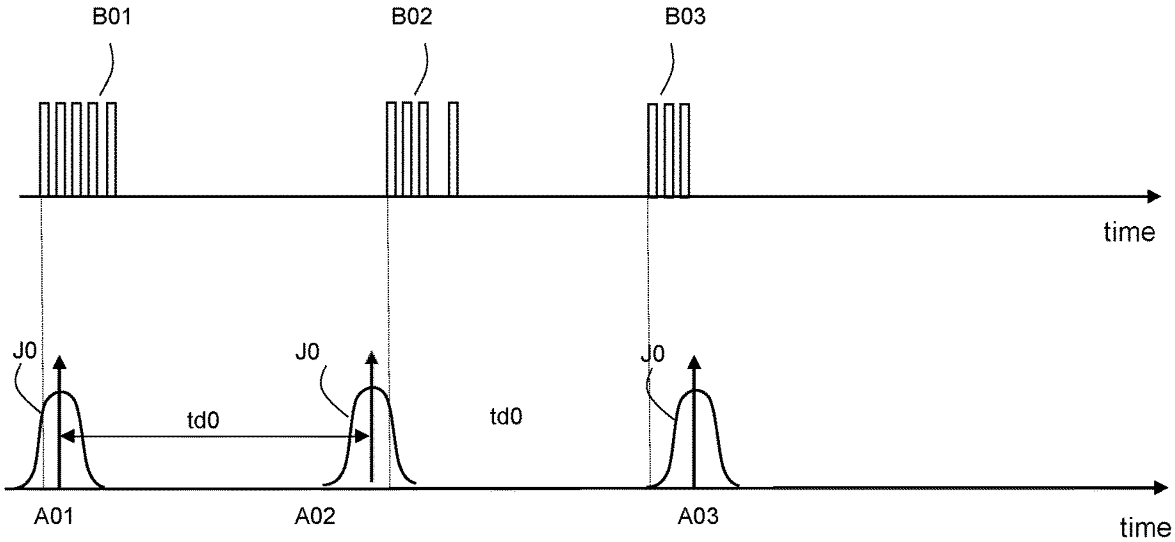
FIG. 5 shows exemplary data traffic comprising a plurality of data bursts having certain time sensitive traffic characteristics according to the prior art.

Some of the embodiments contemplated herein will now be described more fully with reference to the accompanying drawings. The following terms are used throughout the description given below:

Wireless Device, UE: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using radio waves, and/or other types of signals suitable for conveying information through air.

Network Function/Node: As used herein, the network function" can be performed any node in the network e.g., a core network (CN) or a radio access network (RAN) of a cellular communications network that operates to wirelessly transmit and/or receive signals.

Some examples of a radio access node include, but are not limited to, a base station (e.g., a New Radio (NR) base station (gNB) in a 3GPP Fifth Generation (5G) NR network.

The gNB can be divided into physical entities named CU (Centralized Unit) and DU (Distributed Unit), wherein the CU provides support for the higher layers of the protocol stack such as SDAP, PDCP and RRC while DU provides support for the lower layers of the protocol stack such as RLC, MAC and Physical layer. One CU may control multiple DUs; the interface between CU and DU is being referred to as F1 in 3GPP.

It may be noted that the description given herein focuses on a 3GPP cellular communications system and, accordingly, 3GPP terminology or terminology similar to 3GPP terminology is used throughout this document. However, the present invention may as well be implemented in communication technologies like Wide Band Code Division Multiple Access (WCDMA), Worldwide Interoperability for Microwave Access (WiMax), Ultra Mobile Broadband (UMB).

As discussed, a PDU set is composed of one or more PDUs carrying the payload of one unit of information generated at the application level (e.g., a frame or video slice for XRM Services). The PDUs of each PDU set may be regarded as of same importance requirement at application layer. All PDUs in a PDU Set are commonly treated in application layer (e.g., jointly coded/decoded) in order to generate and/or obtain a unit of information at the application level.

By way of example, if the application generates two periodic traffic flows, e.g., one video and one audio flow (each with its own periodicity), some of the PDU Sets will belong to video and some others to audio. The video flow thus corresponds to a plurality of first units of (video) information and the audio flow corresponds to a plurality of second units of (audio) information on application level.

The periodicity per PDU Set (rather than data burst), allows to have a plurality of periodicity values for that single QoS Flow, each corresponding to the PDU Sets of a given traffic flow (If these two traffic flows were multiplexed in a single QoS flow, the data burst concept (associated with the QoS flow), would not be able to distinguish between the video and audio bursts within the same QoS flow).

The periodicity of the time-varying PDU set can be defined in a different way. For example, the periodicity is defined based on the interval between the generation time of consecutive application data units for corresponding PDU sets. If there is a jitter of the generation time in application layer, the periodicity can be determined as an average difference in the generation time of consecutive PDU sets where the generation time of one PDU set can be also average value of each packet generation time in corresponding PDU set.

An application may indicate a reference timing from which the indicated periodicity of the PDU set is applied. The reference timing can be the first PDU generation time, the last PDU generation time, or the average of the generation time of PDU belonging to first PDU set.

The periodicity for a PDU Set flow may be based on expected traffic periodicities that the application would generate.

The TSCAI gets associated with a TSC QoS flow/profile, so if the UE get one TSC QoS flow in the DL and another TSC QoS flow in the UL, the UL and DL may have different TSCAI configured.

The AF may exist in the core network, it may signal the periodicity of traffic belonging to a TSC QoS flow. This can be both DL or DL.

For the UL traffic periodicity to be known the UE may signal it's UL traffic periodicity to the network (to inform the AF). The AF can then signal this information (to SMF) to generate a TSCAI associated with the UL traffic.

Figure 6:
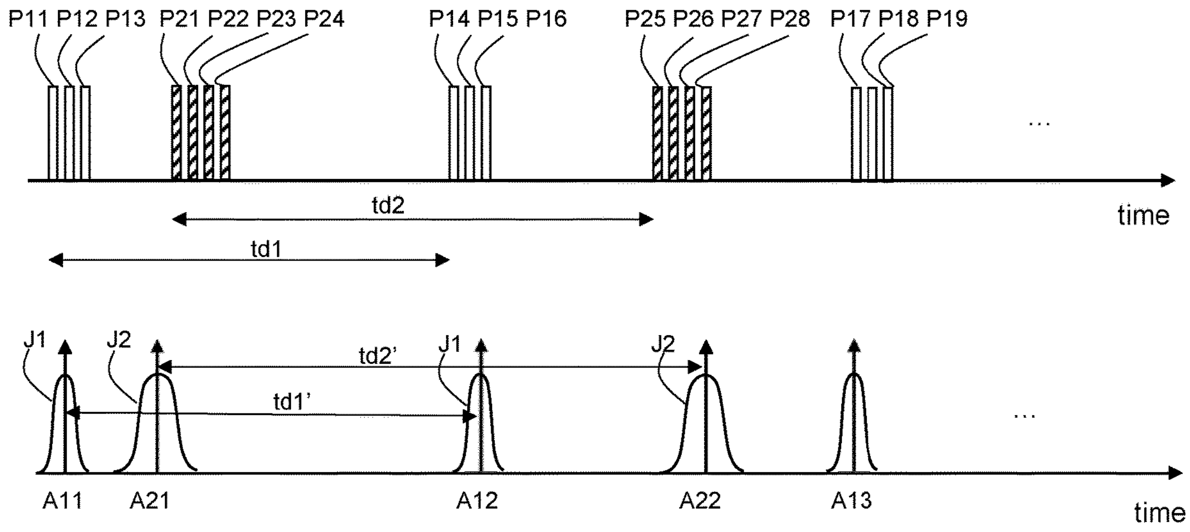
FIG. 6 shows exemplary data traffic comprising a plurality of data packet sets having certain time sensitive traffic characteristics.

FIG. 6 illustrates the concept of determining above described traffic characteristics with respect to PDU sets. By way of example, five PDU sets are depicted, wherein a first PDU set comprises three PDUs P11, P12, P13, a second PDU set comprises four PDUs P21, P22, P23, P24, a third PDU set comprises three PDUs P14, P15, P16, a fourth PDU set comprises four PDUs P25, P26, P27, P28, and a fifth PDU set comprises three PDUs P17, P18, P19.

The first, third and fifth PDU set by way of example are part of a first PDU set flow and the second and fourth PDU set flows are part of a second PDU set flow.

Each PDU set flow has certain time sensitive characteristics: A first periodicity value based on a time difference between corresponding PDU sets in the first PDU set flow is depicted as td1 and a second periodicity value based on a time difference between corresponding PDU sets in the second PDU set flow is depicted as td2. This values, ay be regarded as ideal values, whereas td1' and td2' are time difference values of the real generation times of (each first PDUs) in the corresponding sets.

Further, generation time of PDU sets of the first PDU are depicted as A11, A12 and A13, wherein each of these times are subject to a first jitter characteristics J1, and generation time of PDU sets of the second PDU are depicted as A21, A22, wherein each of these times are subject to a second jitter characteristics J2.

Figure 7:
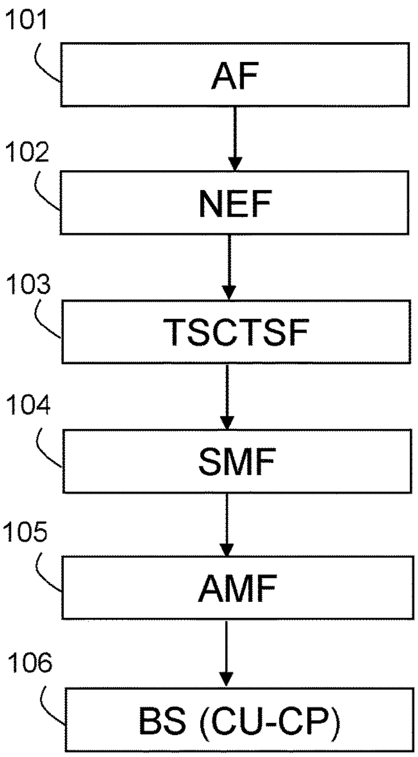
FIG. 7 shows a chain of network functions associated to the processing of time sensitive communication assistance information.

5G core networks are based on service-based architecture, which is centered around network function (NF) services. FIG. 7 shows a set of exemplary functions F101-F106 providing certain NF services e.g., with respect to XR applications.

Application function, AF 101 identifies a plurality of PDU set flows with respect to applications performed by AF 101. Such applications can be XR applications or media services may include multiple traffic streams such as video, audio, haptic data or sensor data etc., which are called multi-modality communication; in the following also being altogether referred to XR applications or XR services.

As e.g., being discussed in 3GPP draft document TR 23.700-60 (current version 010), such applications impose requirements in terms of PDU sets rather than in terms of single packets/PDUs. Packets within the PDU Set may have inherent dependency on each other in media layer. In other words, packets of one PDU set may be jointly processed in AF 101. Considering such dependencies between the packets, the network may perform a scheduling with increased efficiency.

Different XR traffic streams with different QoS parameters are traditionally mapped to different QoS flows.

Accordingly, additionally, packets within the same traffic stream with different packet characteristics (e.g., packet importance, frame type etc.) will be mapped into different flows being referred to as PDU set flows in the following, wherein the PDUs are decoded/handled as a whole (for example, a frame/video slice may only be decoded in case all of the packets carrying the frame/video slice are successfully delivered).

As discussed, each PDU set may comprise one or a plurality of PDUs. The PDUs of one PDU set may be consecutive. A first PDU set flow may comprise a plurality of periodic PDU sets each having a first amount of PDUs (e.g. 3 PDUs as depicted in FIG. 6, e.g. with a periodicity of first time difference td1 as depicted in FIG. 6) A second PDU set flow may comprise a plurality of PDU sets each having a second amount of PDUs (e.g. 4 PDUs as depicted in FIG. 6 with a periodicity of second time difference td2 as depicted in FIG. 6). The first amount my be similar or different to the second amount. Instead of one of the PDF flows or additionally to both PDF flows, there may be a further PDU set flow that may be either non-periodic or the periodicity may be unknown to the AF.

As will be described in more details below, for each PDU set, AF 101 may determine one or a plurality of PDU set periodicity values, PDU set jitter range values (e.g., values characterizing a type, a normal distribution such as standard deviation) and/or time correction values.

AF 101 then generate Time Sensitive Communication (TSC) Assistance Information, TSCAI, being indicative of such values. And transmits them to Network Exposure Function, NEF 102.

NEF 102 forwards towards the TSCAI to a Time Sensitive Communication and Time Synchronization Function, TSCTSF 103.

TSCTSF 103 creates a so-called TSC Assistance Container, TSCAC based on the traffic pattern information provided by an AF/NEF and provides this to Service management function, SMF 104.

SMF 104 can potentially adjust the values inside the TSCAC to account for a clock drift. The (potentially adjusted) TSCAI values are then sent to an Access & Mobility Management Function, AMF 105 that forwards these values the to the 5G-access network (e.g., using the Next Generation Application Protocol, NGAP). Base station 106 (e.g., the central unit control part, CU-CP of a distributed base station) may then perform a scheduling (DL and/or UL scheduling) taking into account the TSCAI.

In the following more detail we be explained with respect to TSCAI:

In an embodiment, a periodicity information being referred to as PDUsetPeriodicity may be provided. This information may comprise a list of periodicities, with one periodicity value for each PDU Set Flow known to be present within the same QoS flow. Knowledge about the number of all PDU Set Flows that exists inside a QoS flow may or may not be known, thus the length of the list may not be a comprehensive list of all the PDU Set Flows and their periodicities.

The periodicity values can in turn represent different possibilities. For example:

- the periodicity may take on a value of the exact or estimated periodicity for PDU Sets belonging to a specific PDU Set Flow;
- the periodicity may indicate a default value, e.g. ‘0’, which indicate that a PDU Set Flow is not periodic; and/or
- the periodicity value may use another reserved value e.g. ‘−1’ indicating that no information about the periodicity is known for this PDU Set Flow In an embodiment, the PDUsetPeriodicity may comprise a list of flags (with for example the values ‘0/1’), with one value for each known PDU Set Flow in the QoS flow. One value (e.g., ‘1’) can indicate that a PDU Set flow is periodic, while another (e.g. ‘0’) can indicate that the flow is not periodic or that the periodicity information is unknown. Alternatively, the PDUsetPeriodicity can be a single flag with values, where:

- One value may indicate that at least one of the PDU Set Flows is not periodic;
- one value may indicate that all the PDU Set Flows are periodic; and/or
- one value may indicate that the periodicity information is unknown.

The periodicity of the time-varying PDU set can be defined in a different way. For example, the periodicity is defined based on the interval between the generation time of consecutive application data units for corresponding PDU sets. If there is a jitter of the generation time in application layer, the periodicity can be also the average difference in the generation time of consecutive PDU sets where the generation time of one PDU set can be also average value of each packet generation time in corresponding PDU set. It is also possible that an application indicates a reference timing from which the indicated periodicity of the PDU set is applied. The reference timing can be the first PDU generation time, the last PDU generation time, or the average of the generation time of PDU belonging to first PDU set.

In an embodiment an attribute for PDU Set jitter may be provided, e.g., being referred to as “PDUsetJitter”. This attribute may comprise list of jitter statistics values, with one entry for each PDU Set Flow present within the same QoS flow. The values in the list can be time values, e.g. maximum latency, minimum latency, other statistical jitter value(s) such as X percentile/mean of latency distribution. It is also possible that a network signals the value X to indicate the level of indicated jitter range or signals the indication of the type of latency distribution.

Alternatively, the PDUsetJitter may comprise a list of flags (similar to the periodicity case described earlier with for example the values ‘0/1’), with one value for each PDU Set Flow in the QoS flow. The value ‘1’ can indicate that a PDU Set Flow does not have jitter, while ‘0’ can indicate that the flow has jitter. Alternatively, the interpretation of ‘0’ and ‘1’ can be swapped.

Another alternative is that the PDUsetJitter can be a single flag with values as in the periodicity case, where:

- one of the values may indicate that at least one of the PDU Set Flows has jitter;
- one value may indicate that none of the PDU Set Flows has jitter; and/or
- one value indicate that the jitter information is unknown In an embodiment an attribute indicating external clock correction may be provided, e.g. being referred to as “timeCorrection”. This attribute can be a single flag (0/1) indicating if SMF has time corrected/adjusted the IE inside the TSCAC when generating the TSCAI. The value ‘1’ can indicate that TSCAC IE’s are corrected/adjusted and a value ‘0’ can indicate that the TSCAC IE’s are not corrected/adjusted. Alternatively, the interpretation of ‘0’ and ‘1’ can be swapped.

In an embodiment, the network can make a local correction based on the observed PDU set arrival time and indicated jitter information. If any PDU at a given PDU set arrives earlier or later than indicated jitter range with a certain occurrence during a specific time period, a network can make network adjustment in relevant features. For example, DRX-startoffset may be incremented by X ms if PDUs arrive X ms later than the maximum jitter and rarely arrives first X ms from the minimum jitter value, wherein X is any real number.

In an embodiment, a further attribute being referred to as “PDU Set Arrival Time” may be provided. This attribute may comprise a list of values indicates the latest arrival time of the first packet in the first PDU Set of each PDU Set Flow. This can be done in a similar fashion as the attributes for periodicity and jitter.

Figure 8:
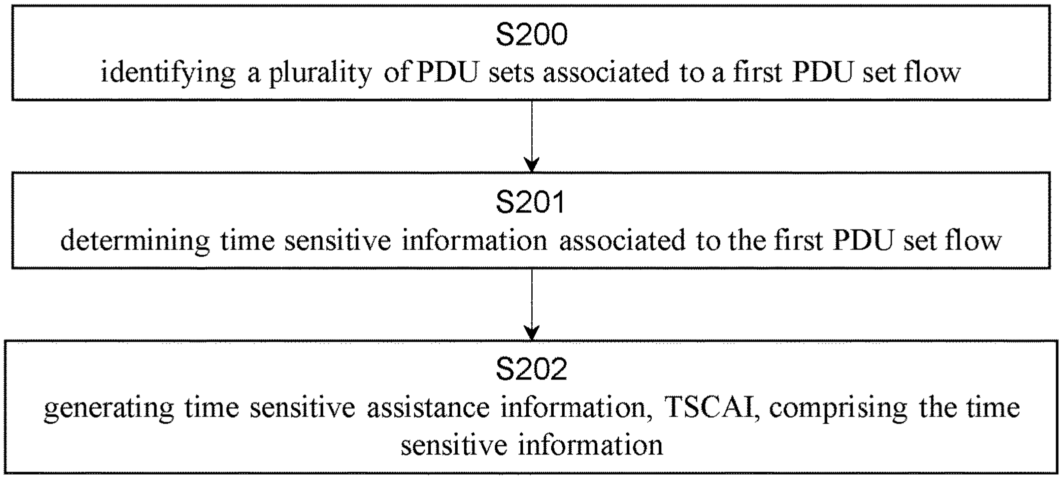
FIG. 8 is a flow chart of exemplary steps performed in the network device.

FIG. 8 shows exemplary steps performed by a network device, the network device comprising an application function, the application function handling information units, wherein each information unit is associated to a set of packet data units, PDU sets, wherein the network device performs the following steps:

- In a first step S200 identifying a plurality of PDU sets associated to a first PDU set flow;
- in a second step 201, determining one or a plurality of data traffic values associated to the first PDU set flow; and
- in a third step S202, generating time sensitive assistance information, TSCAI, comprising the one or a plurality of data traffic values.

The application function may handle information units associated to a least two PDU set flows, wherein the first PDU set flow is associated to a first application level service, and a second PDU set flow is associated to a second application level service, and wherein the network device determines for at least one of the first PDU set flow and the second PDU set flow one or more of the following time sensitive information:

values indicative a periodicity of the PDU sets;

values indicative of a jitter of generation of the PDU set;

values indicative of a time adjustment made with respect o a reference clock; and values indicative of a PDU set arrival time.

The network device may be a UE comprising an application function. The application function in the UE may send the time sensitive information to the network.

Figure 9:
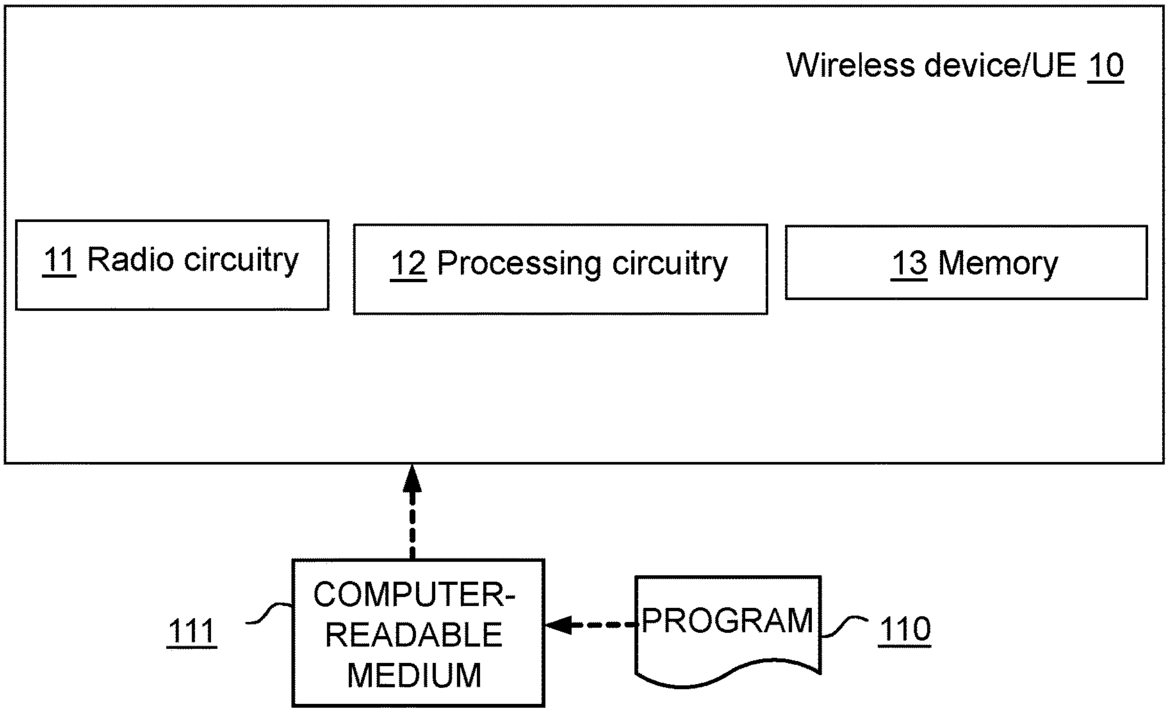
FIG. 9 is an exemplary block diagram of a UE.

As illustrated in FIG. 9, a wireless device, WD, or user equipment, UE, 10 is shows that embodies an application function as being described above. The UE 20 includes an antenna processing circuitry or radio circuitry 11, device-readable medium 11, processing circuitry 12 and memory 11. The UE further may comprise a user power source and power circuitry. UE can include multiple sets of one or more of the illustrated components for different wireless technologies supported by WD, such as, for example, GSM, WCDMA, LTE, NR, WiFi, WiMAX, or Bluetooth wireless technologies, just to mention a few. These wireless technologies can be integrated into the same or different chips or set of chips as other components within UE 10.

The UE further comprises an Antenna that can include one or more antenna arrays, configured to send and/or receive wireless signals. In certain alternative embodiments, the antenna can be separate from UE 10 and be connectable to UE 10 through an interface or port.

Processing circuitry 12 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE 10 components, such as device-readable medium 11, UE 10 functionality. Such functionality can include providing any of the various wireless features or benefits discussed herein. For example, processing circuitry 12 can execute instructions stored in device-readable medium 111 or in memory 110 within processing circuitry 12 to provide the functionality disclosed herein.

Processing circuitry 12 can be configured to perform any determining, calculating, or similar operations (e.g., certain obtaining operations) described herein as being performed by a UE. These operations, as performed by processing circuitry 12, can include processing information obtained by processing circuitry 12 by, for example, converting the obtained information into other information, comparing the obtained information or converted information to information stored by UE 10, and/or performing one or more operations based on the obtained information or converted information, and as a result of said processing making a determination.

Figure 10:
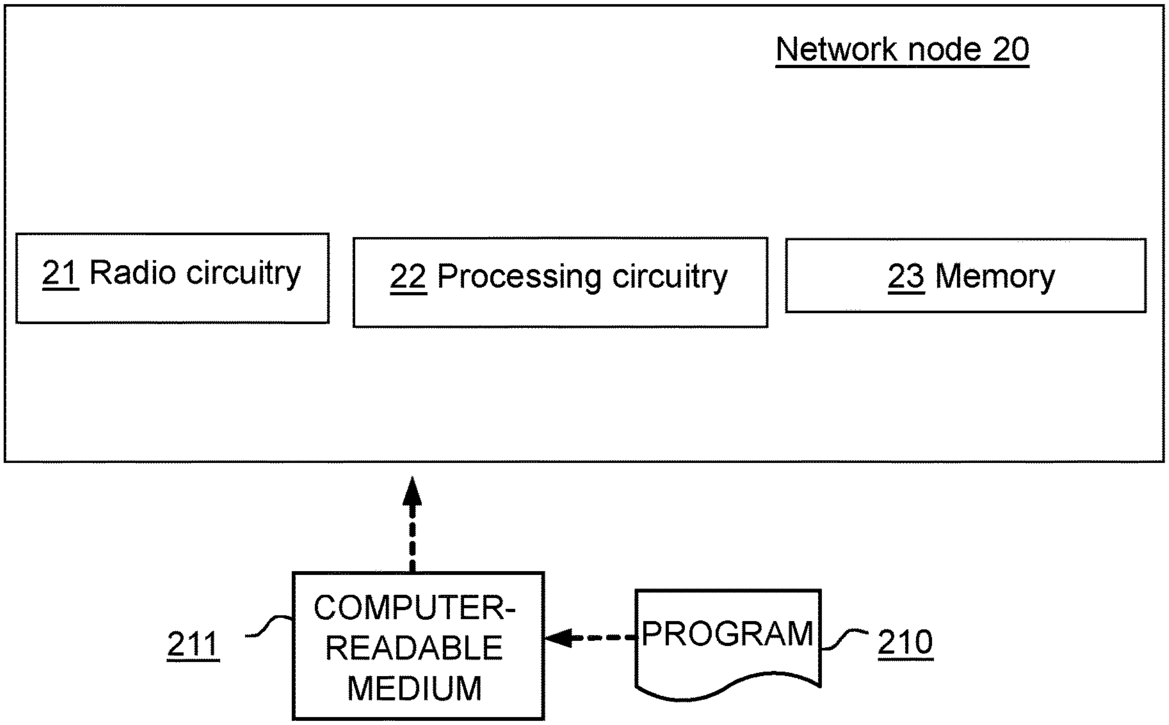
FIG. 10 is an exemplary block diagram of a network node.

FIG. 10 shows a block diagram of an exemplary network node 20, that embodies an application function as being described above. For example, exemplary network node 20 can be configured by execution of instructions, stored on a computer-readable medium, to perform operations corresponding to one or more of the exemplary methods described herein.

Network node 20 can include processor 22 (also referred to as "processing circuitry") that is operably connected to program memory 211 and data memory 210 via a data bus, which can include parallel address and data buses, serial ports, or other methods and/or structures known to those of ordinary skill in the art.

Program memory 211 can store software code, programs, and/or instructions that, when executed by processor 22, can configure and/or facilitate network node 20 to perform various operations, including operations corresponding to various exemplary methods described herein. As part of and/or in addition to such operations, program memory 211 can also include software code executed by processor 22 that can configure and/or facilitate network node 20 to communicate with one or more other UEs or other network nodes node using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio circuitry 21 and/or core network interface 1050. Data memory 203 can comprise memory area for processor 202 to store variables used in protocols, configuration, control, and other functions. As such, program memory 211 and data memory 23 can comprise non-volatile memory (e.g., flash memory, hard disk, etc.), volatile memory (e.g., static or dynamic RAM), network-based (e.g., "cloud") storage, or a combination thereof. Processor 22 can include multiple individual processors (not shown), each of which implements a portion of the functionality described above.

Further Embodiments

Figure 11:
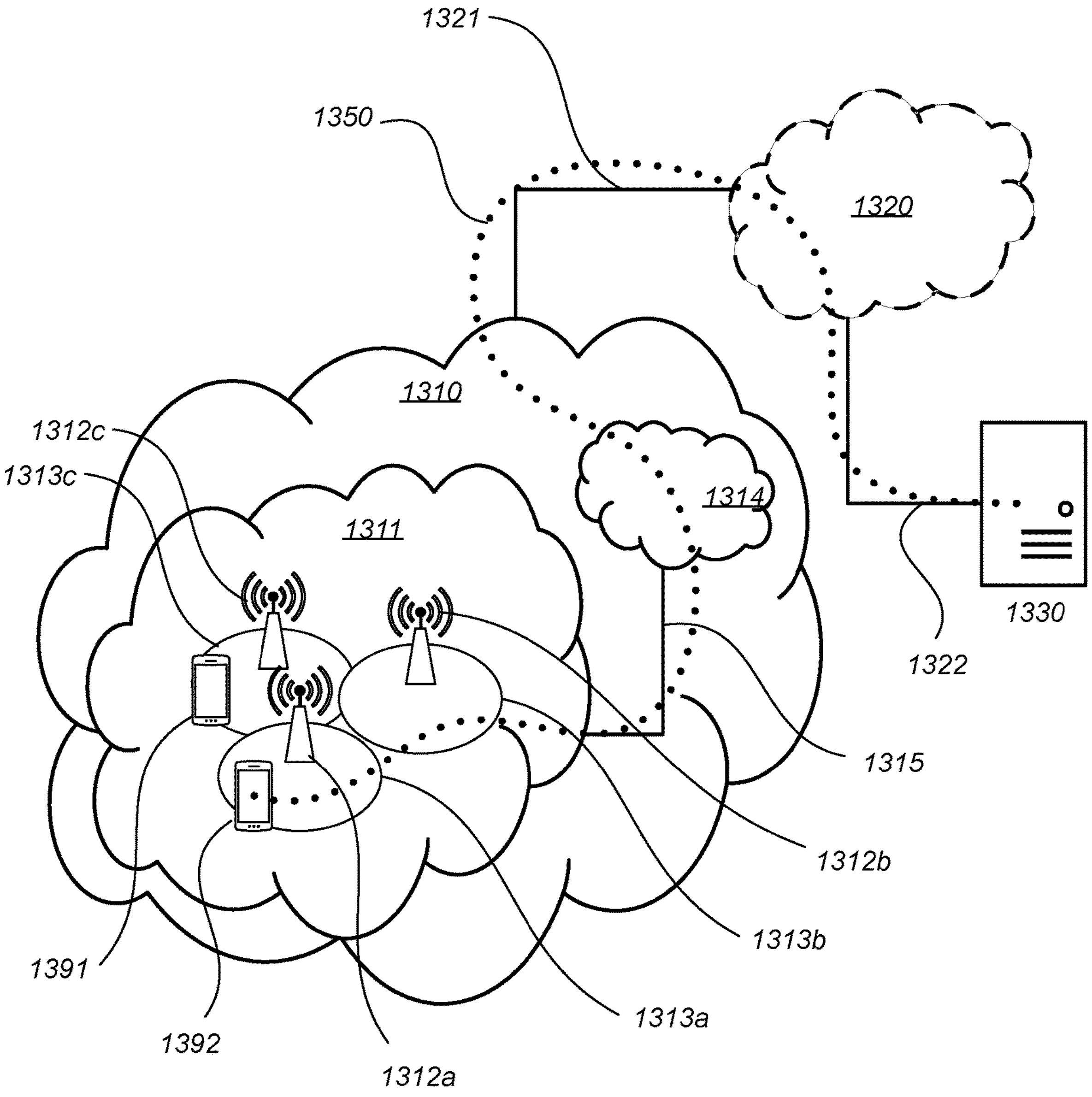
FIG. 11 is a schematic block diagram illustrating a telecommunication network connected via an intermediate network to a host computer.

FIG. 11: Telecommunication Network Connected Via an Intermediate Network to a Host Computer in Accordance With Some Embodiments With reference to FIG. 11, in accordance with an embodiment, a communication system includes telecommunication network 1110 such as the wireless communications network 100, for example, a 3GPP-type cellular network, which comprises access network 1111, such as a radio access network, and core network 1114. Access network 1111 comprises a plurality of network nodes such as any, or both, of the first node 111 and the second node 112. For example, base stations 1112*a*, 1112*b*, 1112*c*, such as NBs, eNBs, gNBs or other types of wireless access points, each defining a corresponding coverage area 1113*a*, 1113*b*, 1113*c*. Each base station 1112*a*, 1112*b*, 1112*c* is connectable to core network 1114 over a wired or wireless connection 1115. A plurality of user equipments, such as the user equipment 110 may be comprised in the wireless communications network 100. In FIG. 11, a first UE 1191 located in coverage area 1113*c* is configured to wirelessly connect to, or be paged by, the corresponding base station 1112*c*. A second UE 1192 in coverage area 1113*a* is wirelessly connectable to the corresponding base station 1112*a*. While a plurality of UEs 1191, 1192 are illustrated in this example, the disclosed embodiments are equally applicable to a situation where a sole UE is in the coverage area or where a sole UE is connecting to the corresponding base station 1112. Any of the UEs 1191, 1192 may be considered examples of the user equipment 110.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

In relation to FIGS. 12, 13, 14, 15, and 16, which are described next, it may be understood that a UE is an example of the user equipment 110, and that any description provided for the UE equally applies to the user equipment 110. It may be also understood that the base station may be considered an example of any, or both, of the first node 111 and the second node 112, and that any description provided for the base station equally applies to any, or both, of the first node 111 and the second node 112.

Figure 14:
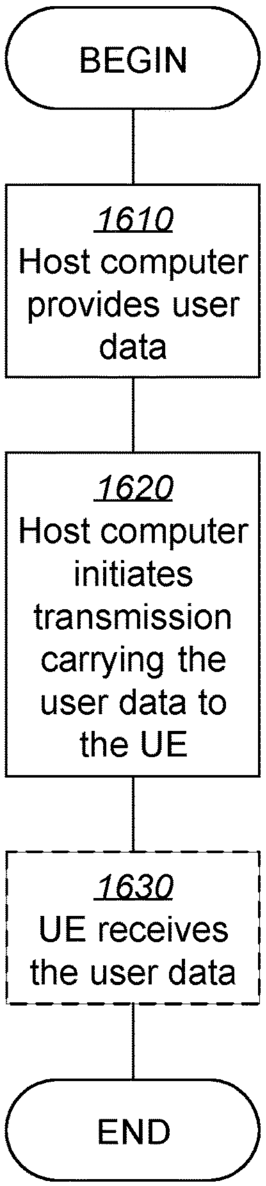
FIG. 14 is a flowchart depicting embodiments of a method in a communications system including a host computer, a base station and a user equipment.

FIG. 14: Host Computer Communicating Via a Base Station With a User Equipment Over a Partially Wireless Connection in Accordance With Some Embodiments Example implementations, in accordance with an embodiment, of the user equipment 110, e.g., a UE, and any, or both, of the first node 111 and the second node 112, e.g., a base station and host computer discussed in the preceding paragraphs will now be described with reference to FIG. 12. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Figure 12:
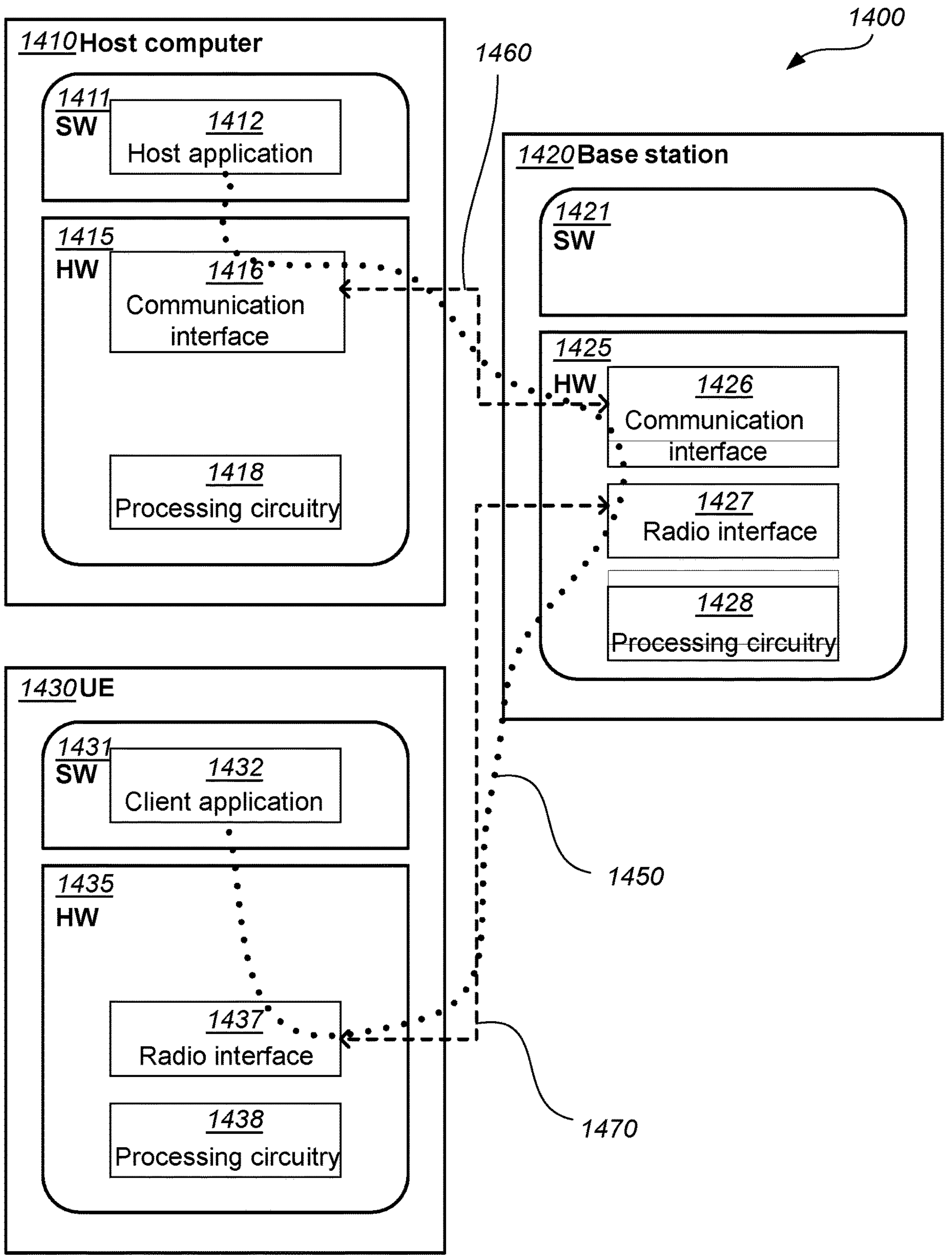
FIG. 12 is a generalized block diagram of a host computer communicating via a base station with a user equipment over a partially wireless connection.
Figure 13:
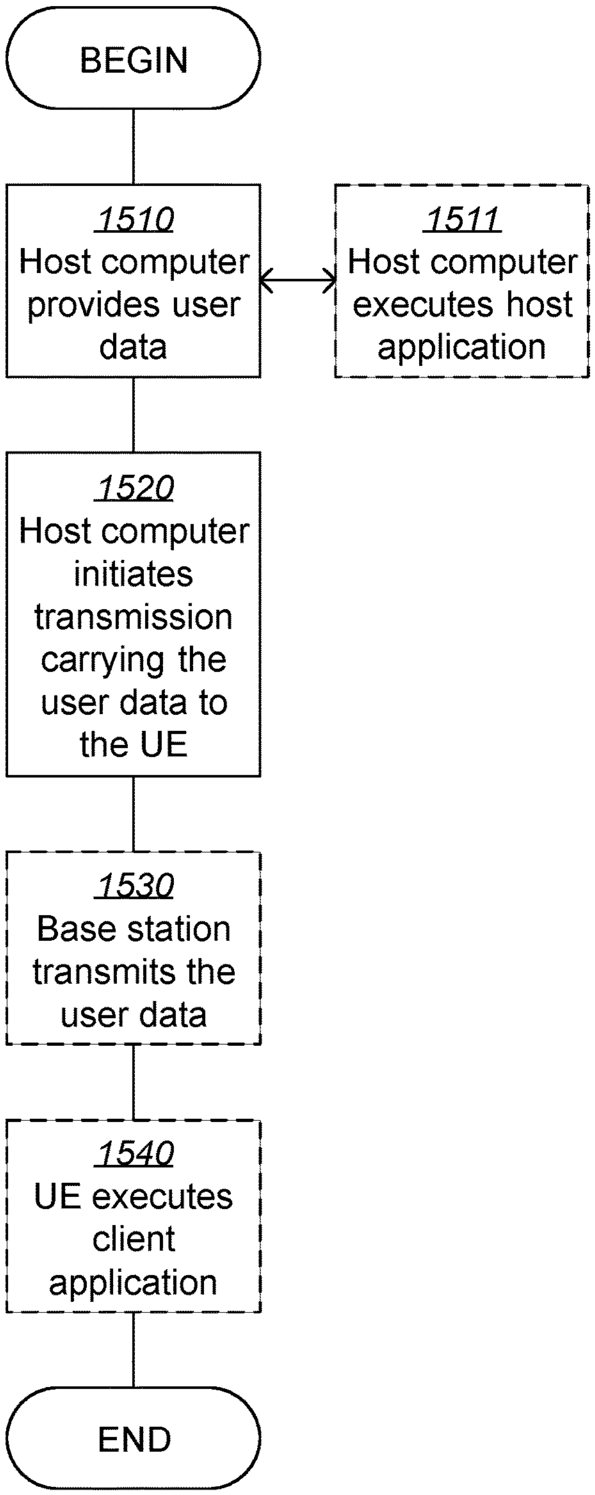
FIG. 13 is a flowchart depicting embodiments of a method in a communications system including a host computer, a base station and a user equipment.

Communication system 1400 further includes any, or both, of the first node 111 and the second node 112, exemplified in FIG. 12 as a base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with the user equipment 110, exemplified in FIG. 12 as a UE 1430 located in a coverage area (not shown in FIG. 12) served by base station 1420. Communication interface 1426 may be configured to facilitate connection 1460 to host computer 1410. Connection 1460 may be direct or it may pass through a core network (not shown in FIG. 12) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides. It is noted that host computer 1410, base station 1420 and UE 1430 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime. A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
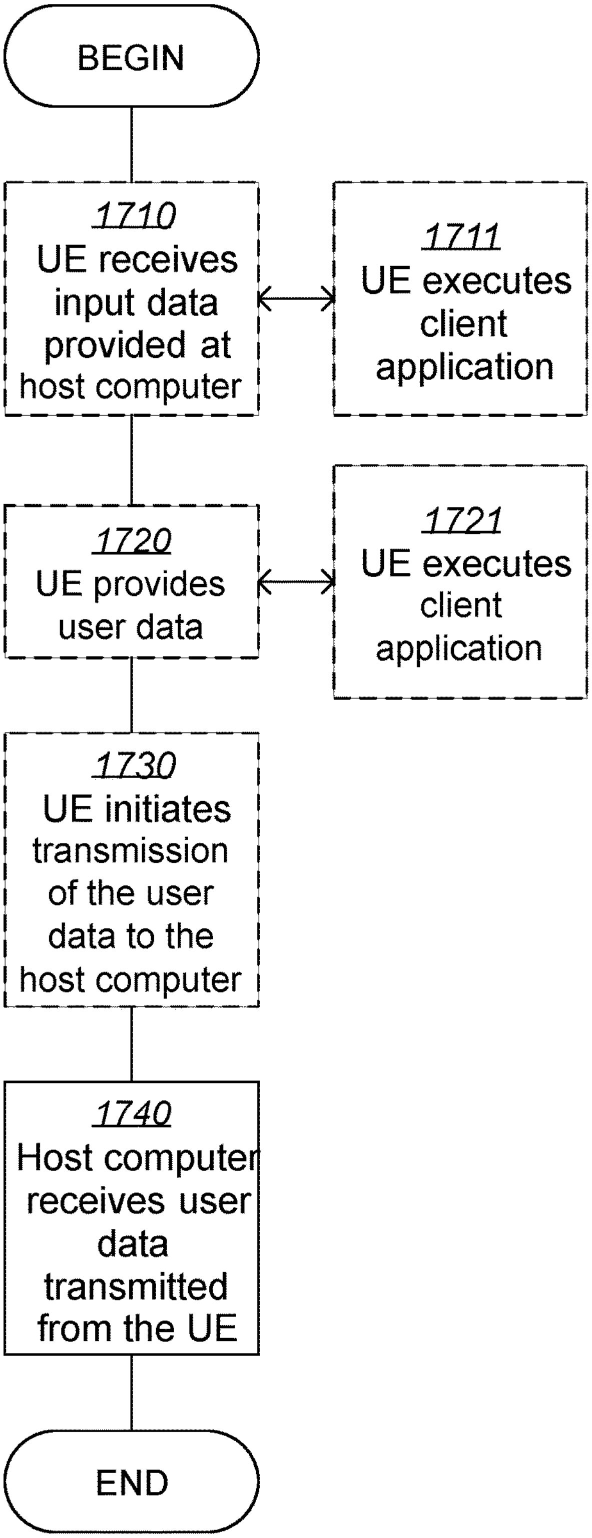
FIG. 15 is a flowchart depicting embodiments of a method in a communications system including a host computer, a base station and a user equipment.

FIG. 15: Methods Implemented in a Communication System Including a Host Computer, a Base Station and a User Equipment in Accordance With Some Embodiments FIG. 15 is a flowchart illustrating a method implemented in a communication system, in accordance with one embodiment. The communication system includes a host computer, a base station and a UE which may be those described with reference to FIGS. 11 and 14. For simplicity of the present disclosure, only drawing references to FIG. 13 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
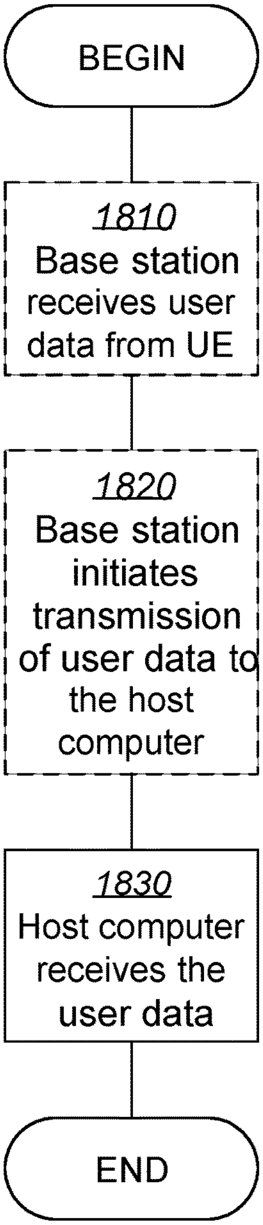
FIG. 16 is a flowchart depicting embodiments of a method in a communications system including a host computer, a base station and a user equipment.

FIG. 16: Methods Implemented in a Communication System Including a Host Computer, a Base Station and a User Equipment in Accordance With Some Embodiments FIG. 16 is a flowchart illustrating a method implemented in a communication system, in accordance with one embodiment. The communication system includes a host computer, a base station and a UE which may be those described with reference to FIGS. 11 and 14. For simplicity of the present disclosure, only drawing references to FIG. 14 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 15: Methods Implemented in a Communication System Including a Host Computer, a Base Station and a User Equipment in Accordance With Some Embodiments FIG. 15 is a flowchart illustrating a method implemented in a communication system, in accordance with one embodiment. The communication system includes a host computer, a base station and a UE which may be those described with reference to FIGS. 11 and 14. For simplicity of the present disclosure, only drawing references to FIG. 15 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 16: Methods Implemented in a Communication System Including a Host Computer, a Base Station and a User Equipment in Accordance With Some Embodiments FIG. 16 is a flowchart illustrating a method implemented in a communication system, in accordance with one embodiment. The communication system includes a host computer, a base station and a UE which may be those described with reference to FIGS. 11 and 14. For simplicity of the present disclosure, only drawing references to FIG. 16 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

The invention claimed is:

1. A method performed by a network device, the network device comprising an application function, the application function handling information units, wherein each information unit is associated to a set of packet data unit (PDU) sets, the method comprising:

identifying a plurality of PDU sets associated to a first PDU set flow;

determining time sensitive information associated to the first PDU set flow; and generating time sensitive assistance information (TSAI) comprising the time sensitive information, wherein the time sensitive information included in the TSAI comprises:

information indicative of an average periodicity of the generation of consecutive PDU sets of the first PDU set flow; or information indicative of a jitter of the generation of the consecutive PDU-set; sets of the first PDU set flow.

2. The method of claim 1, wherein the application function handles information units associated to a least the first PDU set flow and a second PDU set flow, the first PDU set flow is associated to a first application level service, the second PDU set flow is associated to a second application level service, and the network device determines the average periodicity of the generation of the consecutive PDU sets of the first PDU set flow and/or the jitter of the generation of the consecutive PDU sets of the first PDU set flow.

3. The method of claim 1, wherein the network device determines the information indicative of the average periodicity based on a periodicity of the corresponding PDU sets.

4. The method of claim 3, wherein the average periodicity is determined by averaging a certain number of measurements with respect to generation times of the consecutive PDU sets.

5. The method of claim 2, wherein the information indicative of the average periodicity indicates i) that the PDU sets of the PDU set flow are:

periodic, ii) that the PDU sets of the PDU set flow are not periodic, or iii) that a periodicity is not known.

6. The method of claim 5, where the application function indicates a reference timing from which the indicated average periodicity of the PDU set is applied, wherein the reference timing may be one of: a PDU generation time of the first PDU, a PDU generation time of the last PDU, and an average of generation times of all PDUs belonging to the consecutive PDU sets.

7. The method of claim 1, wherein the information indicative of a of the jitter comprises one or a plurality of jitter statistic values.

8. The method of claim 7, wherein the jitter statistic values are time values indicative of: a maximum latency, a minimum latency, a type of statistical latency distribution, and/or characteristics or parameters of a statistical latency distribution.

9. The method of claim 7, wherein the information indicative of the jitter comprises certain values indicating that the PDU set flow is affected by jitter, that the PDU set flow is not affected by jitter and/or that a jitter is not known for the PDU set flow.

10. The method of claim 9, wherein a first value indicates that the PDUs in the PDU set flow do not have jitter, a second value indicates that the PDUs have jitter.

11. The method of claim 10, wherein a third value indicates that the jitter is not known.

12. The method of claim 1, wherein the time sensitive information is transmitted to a radio access function for scheduling the data traffic.

13. The method of claim 12, wherein the TSAI is transmitted to a Time Sensitive Communication and Time Synchronization Function in the core network.

14. A network device for handling information units, wherein each information unit is associated to a set of packet data unit (PDU) sets, the network device comprising:

processing circuitry; and memory, wherein the network device is configured to perform a method comprising:

identifying a PDU sets associated to a first PDU set flow;

determining time sensitive information associated to the first PDU set flow; and generating time sensitive assistance information (TSAI) comprising the time sensitive information, wherein the time sensitive information included in the TSAI comprises:

information indicative of an average periodicity of the generation of consecutive PDU sets of the first PDU set flow; or information indicative of a jitter of the generation of the consecutive PDU sets of the first PDU set flow.

15. The network device of claim 14, wherein the network device is a user equipment.

16. The network device of claim 14, the network device is a network application node.

* * * * *